(12) United States Patent
Seigler

(10) Patent No.: US 7,706,103 B2
(45) Date of Patent: Apr. 27, 2010

(54) ELECTRIC FIELD ASSISTED WRITING USING A MULTIFERROIC RECORDING MEDIA

(75) Inventor: Michael Allen Seigler, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 745 days.

(21) Appl. No.: 11/492,337

(22) Filed: Jul. 25, 2006

(65) Prior Publication Data

US 2008/0024910 A1    Jan. 31, 2008

(51) Int. Cl.
    *G11B 5/127* (2006.01)
(52) U.S. Cl. ................................. 360/125.17
(58) Field of Classification Search ............... 360/110, 360/133, 135, 125.3, 131, 125.17; 365/245, 365/145
    See application file for complete search history.

(56) References Cited

U.S. PATENT DOCUMENTS

| | | | |
|---|---|---|---|
| 4,520,413 A * | 5/1985 | Piotrowski et al. ........ 360/328 |
| 5,110,651 A | 5/1992 | Massard et al. |
| 5,390,142 A * | 2/1995 | Gendlin .................... 365/145 |
| 5,524,092 A * | 6/1996 | Park ......................... 365/145 |
| 5,746,893 A * | 5/1998 | Kobayashi et al. ....... 204/192.2 |
| 5,876,858 A | 3/1999 | Ikeya et al. |
| 5,906,884 A | 5/1999 | Yahisa et al. |
| 6,011,664 A | 1/2000 | Kryder et al. |
| 6,214,482 B1 | 4/2001 | Jahnes et al. |
| 6,387,476 B1 | 5/2002 | Iwasaki et al. |
| 6,947,311 B2 | 9/2005 | Berner et al. |
| 7,230,308 B2 * | 6/2007 | Iwata ........................ 257/421 |
| 7,282,755 B2 * | 10/2007 | Pakala et al. .............. 257/295 |
| 7,358,846 B2 * | 4/2008 | Doudin .................... 338/32 R |
| 7,394,622 B2 * | 7/2008 | Gage et al. ................ 360/135 |
| 7,397,624 B2 * | 7/2008 | Johns et al. ................. 360/75 |
| 2003/0197970 A1 * | 10/2003 | Srinivasan ............... 360/77.16 |
| 2005/0041335 A1 * | 2/2005 | Kikitsu et al. ............. 360/110 |
| 2005/0122612 A1 * | 6/2005 | Albrecht et al. ............. 360/59 |

OTHER PUBLICATIONS

H. Zheng et al., "Multiferroic $BaTiO_3$-$CoFe_2O_4$ Nanostructures", Science, vol. 303, Jan. 30, 2004, pp. 661-663.
T. Lottermoser et al., "Magnetic Phase Control by an Electric Field", Nature, vol. 430, Jul. 29, 2004, pp. 541-544.
M. Fiebig, "Revival of the Magnetoelectric Effect", J. Phys. D: Appl. Phys., vol. 38, 2005, pp. R123-R152.

* cited by examiner

*Primary Examiner*—Angel A. Castro
(74) *Attorney, Agent, or Firm*—Robert P. Lenart, Esq.; Pietragallo Gordon Alfano Bosick & Raspanti, LLP

(57) ABSTRACT

An apparatus comprises a data storage medium including a piezoelectric material and a ferromagnetic material, an electric field source for applying an electric field to a portion of the data storage medium, and a write pole for applying a magnetic field to the portion of the data storage medium. A method performed by the apparatus is also provided.

13 Claims, 4 Drawing Sheets

ELECTRIC FIELD ASSISTED WRITING USING A MULTIFERROIC RECORDING MEDIA

FIELD OF THE INVENTION

This invention relates to methods and apparatus for data storage, and more particularly to such methods and apparatus that can be used in electric field assisted magnetic recording.

BACKGROUND OF THE INVENTION

Attempts to increase the capacity of magnetic data storage devices must balance writability, grain size and magnetic anisotropy in the magnetic data storage media. Write heads can only generate a limited magnetic field, and this limit is set by the maximum volume magnetization that can be achieved in a material, the maximum current density that can be put through a conductor, and the head-to-media separation. If the anisotropy in the media is lowered to the point where it can be written by the write head and the grains are made small enough to maintain an acceptable signal-to-noise ratio, the media may not be thermally stable for large areal densities. This is referred to as the superparamagnetic limit.

Ferroelectric (FE) data storage media has the advantage that it is written using an electric field, and very large electric field values can be generated with a thin-film device. Thus, FE media with a very large anisotropy can be written by a thin-film device, and a thermally stable FE media with very small domains (and narrow domain walls) can be written. One of the problems with using FE recording is that the readback is difficult. Free electric charge tends to shield the polarization pattern in the FE media, which then requires one to use a write before read method for readback. Since free magnetic charges don't exist, this is not a problem for magnetic media and readback is relatively easy.

Recently, composite materials, combining magnetoelastic and ferroelectric materials, have been developed that have both ferromagnetic (FM) and FE properties above room temperature. Two example composites are $BiFeO_3$—$CoFe_2O_4$ and $BaTiO_3$—$CoFe_2O_4$. In these examples the $BiFeO_3$ and $BaTiO_3$ are the FE materials and the $CoFe_2O_4$ is the FM material.

Others have demonstrated the use of an electric field to switch the magnetization in a $BiFeO_3$—$CoFe_2O_4$ composite. The composite consisted of $CoFe_2O_4$ nanopillars in a $BiFeO_3$ matrix. The material was deposited using pulsed laser deposition at 700° C. on $SrRuO_3$ and resulted in a fully epitaxial film, including across the $BiFeO_3$—$CoFe_2O_4$ grain boundary. The magnetization was saturated by applying a large, uniform magnetic field, and then 50 to 60% of the magnetization was switched by applying an electric field using a piezoelectric force microscope (PFM). The films referred to above were not used for data storage.

There remains a need for a magnetic data storage method and apparatus that can provide adequate thermal stability and adequate signal-to-noise ratio (SNR).

SUMMARY OF THE INVENTION

In one aspect, the invention provides an apparatus comprising a data storage medium including a piezoelectric material and a ferromagnetic material, an electric field source for applying an electric field to a portion of the data storage medium, and a magnetic field source for applying a magnetic field to the portion of the data storage medium.

In another aspect, the invention provides a method comprising: applying an electric field to a portion of a data storage medium including a piezoelectric material and a ferromagnetic material, and applying a magnetic field to the portion of a data storage medium to switch a direction of magnetization of domains in ferromagnetic material in the data storage medium.

In various embodiments, the data storage medium can comprise: a layer of the ferromagnetic material adjacent to a layer of the piezoelectric material; a plurality of islands of the ferromagnetic material in a matrix of the piezoelectric material; a plurality of pillars in a matrix of non-ferroelectric and non-piezoelectric material, wherein each of the pillars includes a layer of the ferromagnetic material and a layer of the piezoelectric material; a plurality of ferromagnetic nanoparticles in a matrix of the piezoelectric material, or a plurality of piezoelectric nanoparticles in a matrix of ferromagnetic material; or a plurality of nanoparticles in a matrix of non-ferroelectric and non-piezoelectric material, wherein each of the nanoparticles includes the ferromagnetic material and the piezoelectric material.

The electric field source can comprise an electrode and a voltage source, with the voltage source being connected between the electrode and the data storage medium or between the electrode and the magnetic field source.

In another example, the electric field source can comprise first and second electrodes, and a voltage source connected between the first and second electrodes.

DETAILED DESCRIPTION OF THE INVENTION

This invention provides a method and apparatus for electric field assisted magnetic recording that is implemented using a data storage media including a piezoelectric material (PE) and a ferromagnetic or ferrimagnetic material (FM), a magnetic field source such as for example a magnetic write pole, and an electric field source for subjecting the storage media to an electric field. The media is referred to as a multiferroic (MF) media. As used herein, multiferroic media is a storage media that includes a piezoelectric material and a ferromagnetic or ferrimagnetic material, where the piezoelectric material may be, but is not necessarily, a ferroelectric material.

Also, as used in this description, the term ferroelectric material includes both ferroelectric and ferrielectric materials. Also, as used in this description, the term ferromagnetic material includes both ferromagnetic and ferrimagnetic materials.

In one example, the electric field is applied to reduce the out-of-plane magnetic anisotropy in the magnetic material, and then a magnetic field having a large out-of-plane component is applied to write to the magnetic material. More specifically, the electric field is used to rotate the magnetic anisotropy of the magnetic material from an out-of-plane direction toward an in-plane direction. This assumes that the invention is used for perpendicular recording. However, it should be understood that the invention could also work with longitudinal recording. In the longitudinal recording case, the electric field would be applied to reduce the in-plane magnetic anisotropy in the magnetic material, and then a magnetic field having a large in-plane component would be applied to write to the magnetic material. In each case, the stored data bits can be read back using a magnetic sensor.

Figure 1:
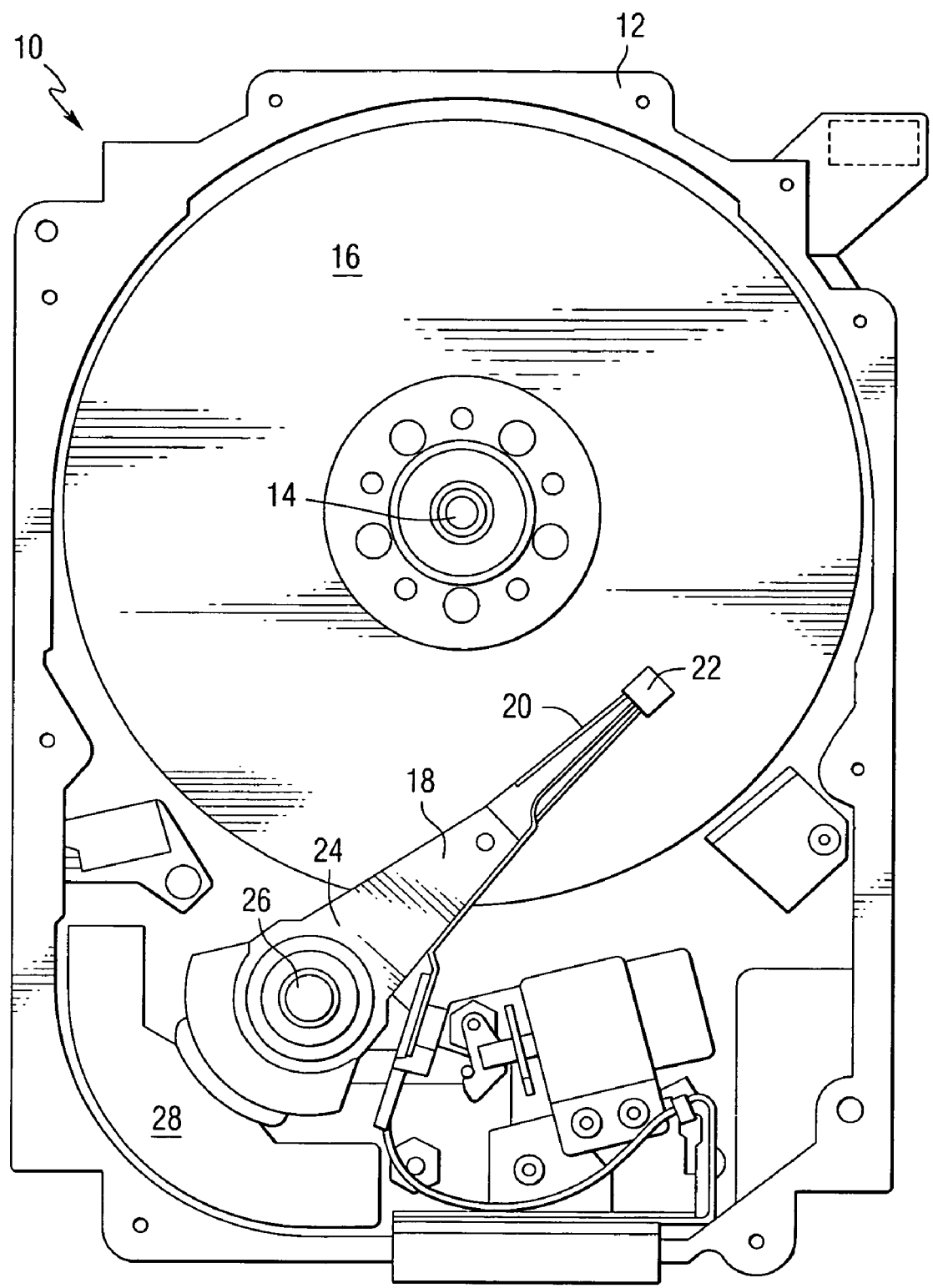
FIG. 1 is a pictorial representation of a disc drive that can include this invention.

In one aspect, the invention provides an apparatus for magnetic recording. FIG. 1 is a pictorial representation of a disc drive 10 that can utilize an embodiment of the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

While the invention can be used in a disc drive as shown in FIG. 1, it should be understood that the invention is also applicable to other types of data storage devices, such as probe storage devices.

Figure 2:
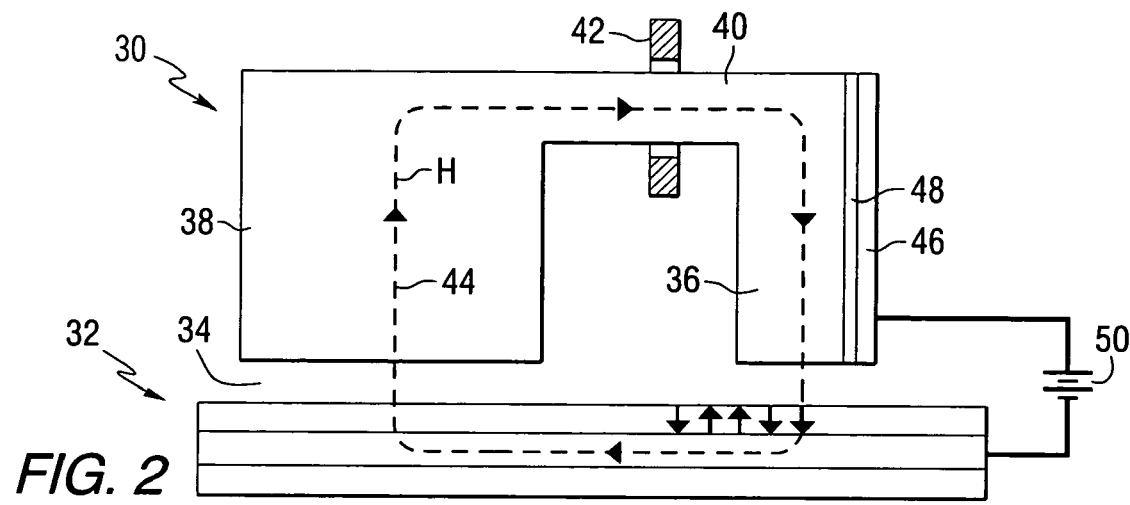
FIG. 2 is a schematic representation of a recording head constructed in accordance with an embodiment of the invention.

FIG. 2 is a schematic representation of a portion of an apparatus constructed in accordance with an embodiment of the invention. The apparatus includes a recording head 30 positioned adjacent to a data storage media 32, and separated from the media by an air bearing 34. The recording head includes a write pole 36 and a return pole 38. The write pole and return pole are magnetically coupled by a yoke 40. Electric current in a coil 42 is used to create magnetic flux 44 that extends from the write pole, through the media, and to the return pole. An electrode 46 is positioned near the write pole. In this example, the electrode is electrically insulated from the write pole by a layer of insulating material 48. A voltage source 50 is connected to the electrode, and in this example, to the media. The voltage source establishes a voltage between the electrode and the media, thereby subjecting the media to an electric field. The electric field will be turned on and off so that it is only on during writing. Thus the voltage will switch at a low frequency compared to the writing current.

Figure 3:
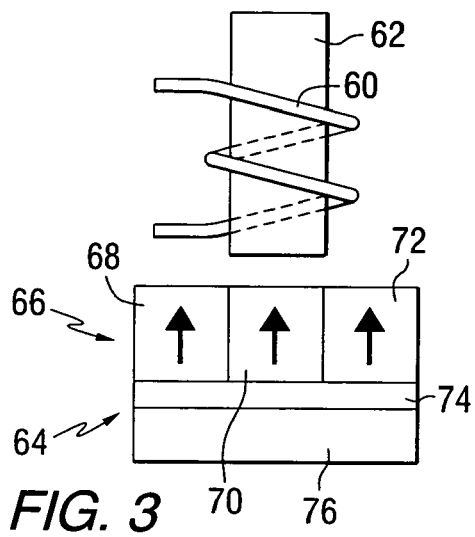
FIGS. 3, 4, 5 and 6 are schematic representations of a recording head and media, which illustrate the operation of the invention.

FIGS. 3-6 are schematic representations of a write pole and a storage media that illustrate the writing of a data bit utilizing electric field assisted writing and a multiferroic media. FIG. 3 shows a schematic representation of elements of a write head including a coil 60 wrapped around a magnetic write pole 62, positioned adjacent to a multiferroic media 64. The media includes a recording layer 66 including a plurality of recording bits 68, 70 and 72 of magnetic material, each having a single magnetic domain. In various embodiments, for example, the recording bits could be separated by a piezoelectric material; could themselves be a piezoelectric/ferromagnetic multilayer; or could be spheres embedded in a matrix.

The magnetic anisotropy of the domains results in directions of magnetization indicated by arrows. The recording layer is positioned on a layer 74 of insulating material, which is positioned on a substrate 76 to separate the media from the electrode. This insulator may or may not be necessary, depending on the media type used. If there is an electrical short through the media, such as through ferromagnetic (FM) pillars in a piezoelectric (PE) matrix, the insulator would be needed. If the media includes FM spheres in an insulating PE matrix, the insulator would probably not be needed.

Figure 4:
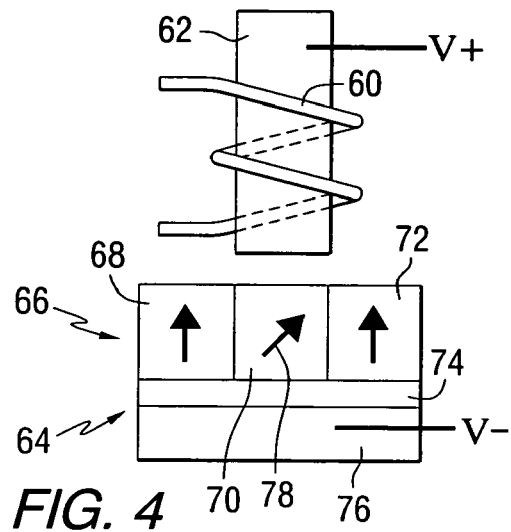

FIG. 4 shows that a voltage has been applied between the write pole and the media to produce an electric field that lowers the out-of-plane magnetic anisotropy (illustrated by arrow 78) of bit 70 such that the magnetization has rotated toward the in-plane orientation.

Figure 5:
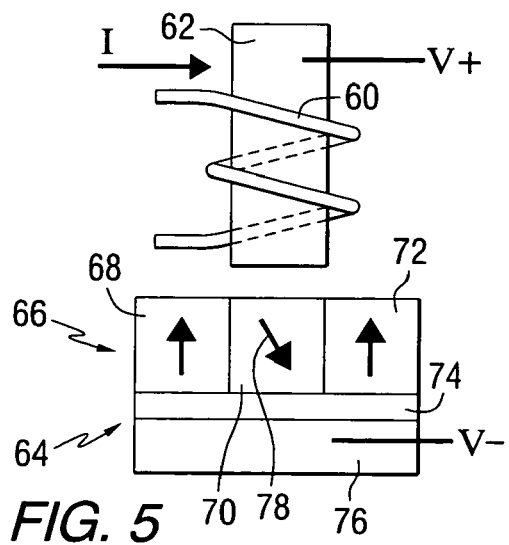

FIG. 5 shows the application of an electric current to the coil to produce a magnetic field that is applied to the media by the write pole. When both the magnetic field and electric field are applied, the magnetic anisotropy is lowered by the electric field and the magnetization is switched by the magnetic field. The order in which the fields are applied is not important, at least not in the static case. For the device in FIG. 2, it would probably be desirable for the bit to first pass under the electrode and then the magnetic pole. This way the bit is exposed to the magnetic field as the electric field becomes weaker and the magnetization direction gets set.

Figure 6:
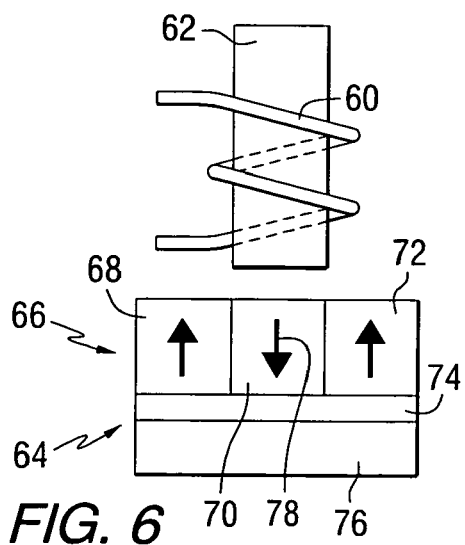

FIG. 6 shows the final magnetization state after the magnetic and electric fields are turned off. To summarize, FIG. 3 shows the initial state, FIG. 4 shows the state when the electric field is applied to the media, FIG. 5 shows the state when both the magnetic and electric fields are applied to write to the media, and FIG. 6 shows the final state where the magnetization of a bit in the media has been switched with respect to the initial state shown in FIG. 3.

Figure 7:
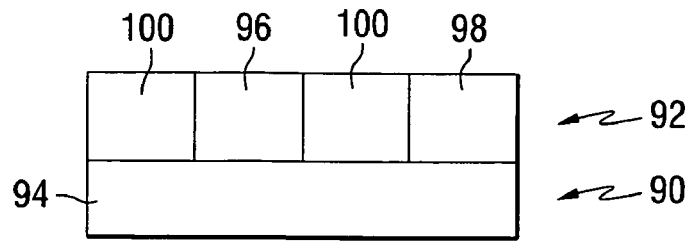
FIG. 7 is a cross-sectional view of a data storage media that can be used in accordance with an embodiment of the invention.
Figure 8:
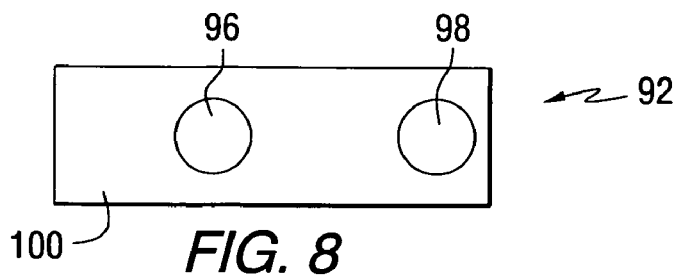
FIG. 8 is a top plan view of the data storage media of FIG. 7.

FIG. 7 is a cross-sectional view of a data storage media 90 that can be used in accordance with an embodiment of the invention. The data storage media includes a recording layer 92 on a substrate 94. The recording layer includes pillars of ferromagnetic material 96 and 98 in a matrix of piezoelectric material 100. FIG. 8 is a top plan view of the data storage media of FIG. 7.

Figure 9:
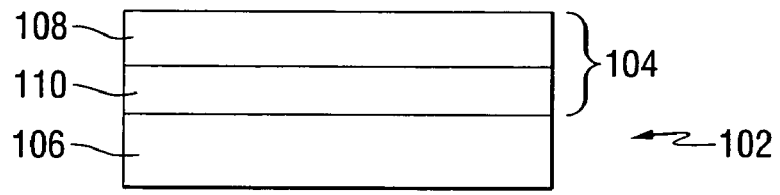
FIGS. 9 and 10 are cross-sectional views of data storage media that can be used in accordance with an embodiment of the invention.

FIG. 9 is a cross-sectional view of a data storage media 102 that can be used in accordance with another embodiment of the invention. The data storage media includes a recording layer 104 on a substrate 106. The recording layer includes a layer 108 of ferromagnetic material on a layer 110 of piezoelectric material. The order of the FM and PE materials can be reversed, and the media may be a multilayer structure, with the FM and PE layers repeated more than once.

Figure 10:
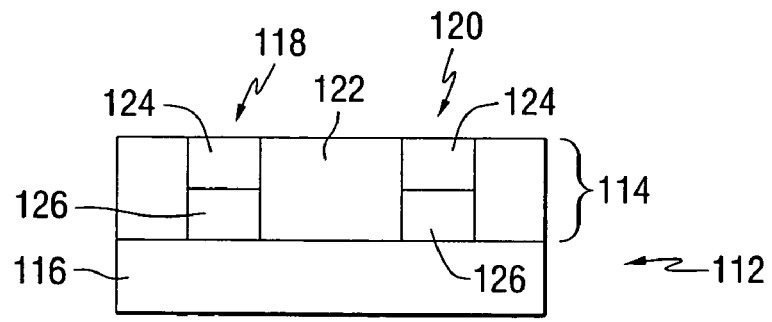

FIG. 10 is a cross-sectional view of a data storage media 112 constructed in accordance with another embodiment of the invention. The data storage media includes a recording layer 114 on a substrate 116. The recording layer includes pillars (or islands) 118 and 120 in a matrix of material 122 that is neither ferroelectric nor ferromagnetic. Each of the pillars includes a layer 124 of ferromagnetic material and a layer 126 of piezoelectric material. The order of the FM and PE materials can change and the pillars may be constructed using a multilayer configuration that is repeated more than once.

The media of FIGS. 9 and 10 include a multilayer of FE and FM materials in the form of a simple bilayer. The electric-to-magnetic coupling in the multilayer media would be enhanced if it was patterned similar to bit patterned media (BPM). These films would not need to be epitaxially grown, which should make their deposition simple. For example, one could start with a PZT film grown on a single crystal substrate, deposit a Ta layer to breakup local epitaxy, and then deposit a Terfeno-D film. These films could then be patterned similar to BPM.

Figure 11:
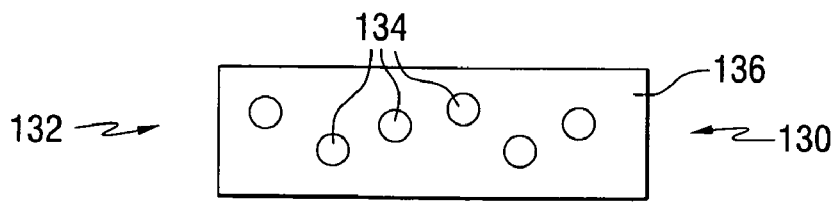
FIG. 11 is a schematic representation of a data storage media that can be used in accordance with another embodiment of the invention.

FIG. 11 is a schematic representation of a data storage media 130 constructed in accordance with another embodiment of the invention. The data storage media includes a recording layer 132 including a plurality of nanoparticles of ferromagnetic material 134 in a matrix of piezoelectric material 136. Alternatively, the matrix could be the FM material and the nanoparticles the PE material. In another example, the nanoparticles could include both piezoelectric and ferromagnetic material. In that case, one material could be a shell around the other material.

Figure 12:
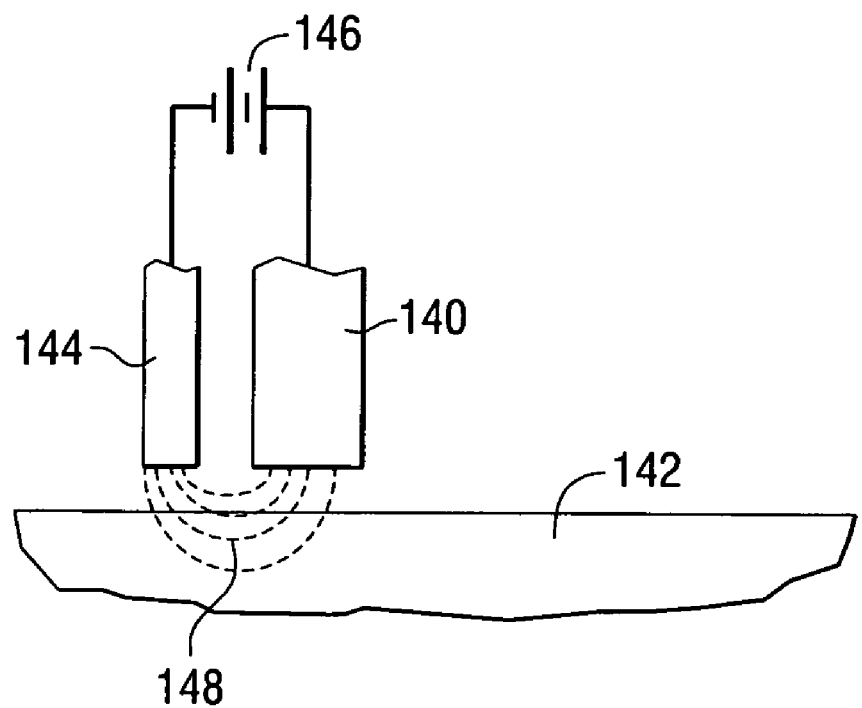
FIGS. 12 and 13 are schematic representations of other apparatus constructed in accordance with other embodiments of the invention.
Figure 13:
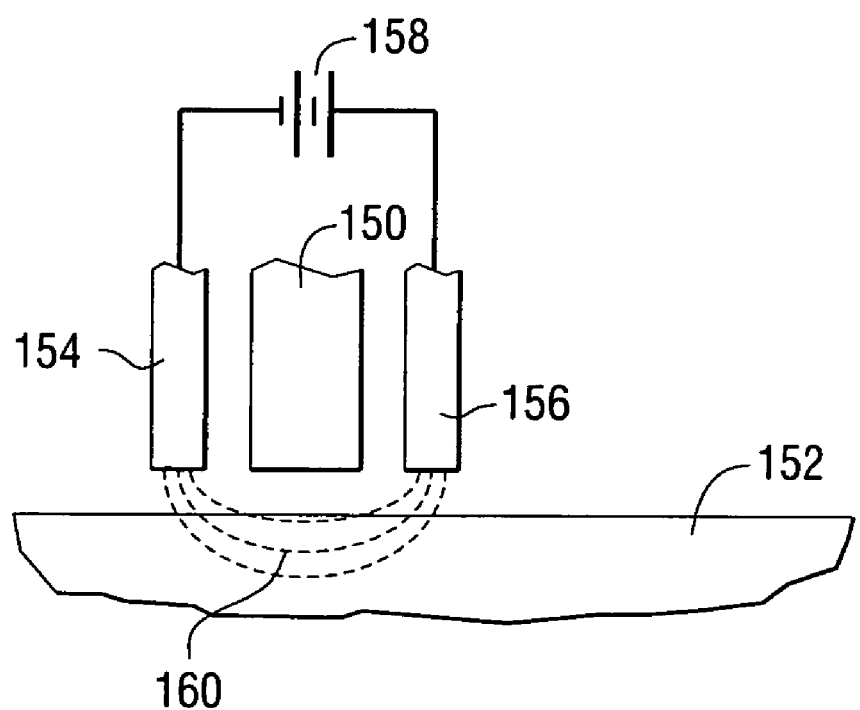

FIGS. 12 and 13 are schematic representations of apparatus constructed in accordance with other embodiments of the invention. FIG. 12 shows a write pole 140 of a recording head that is positioned adjacent to a multiferroic (MF) media 142. An electrode 144 is positioned adjacent to the write pole and a voltage source 146 is used to supply a voltage between the electrode and the write pole. In this example, the media is subjected to a fringing electric field as illustrated by lines 148.

FIG. 13 shows a write pole 150 of a recording head that is positioned adjacent to a multiferroic (MF) media 152. First and second electrodes 154 and 156 are positioned adjacent to, and on opposite sides of the write pole. A voltage source 158 is used to supply a voltage to the electrodes. In this example, the media is subjected to a fringing electric field as illustrated by lines 160.

As stated above, the piezoelectric material doesn't necessarily need to be ferroelectric, which allows for a wider variety of the material choices. In addition, the FE and FM materials need not be fully epitaxial. There are many FE and FM materials that could be used in the recording layer such as, but not limited to: standard magnetic media alloys, $Tb_xDy_{1-x}Fe_y$, [wherein $0.30<x<0.33$ and $1.8<y<2.2$], $NiFe_2O_4$, FePt, $Co_3Pt$, a Co/Pt multilayer, or a Co alloy; and PZT ($PbZrTiO_3$), PT ($PbTiO_3$), PZ ($PbZrO_3$), PLZT $(PbLa)(ZrTi)O_3$, $Pb(Mg,Nb)O_3$, $Pb(Zn,Nb)O_3$, or $Pb(Sc,Nb)O_3$. The multiferroic media could be formed in a manner similar to bit patterned media (BPM), where the magnetic bits are patterned into the media and the matrix filler is a piezoelectric material.

The data storage medium can include other layers in addition to the layers described above. Furthermore, the voltage may be applied directly to a layer other than the ferromagnetic or piezoelectric layers, as long as the electric field acts upon at least the piezoelectric material.

While use of the invention for perpendicular recording is described above, the invention can also be applied to longitudinal media, in which case, the magnetic anisotropy in the media would need to be longitudinal instead of perpendicular, and the magnetic field applied by the recording head would need to have a substantial in-plane component. In either case, the correct signs for the magnetostriction of the magnetic material and piezoelectric effect would need to be chosen. When the electric field is applied, the PE material will expand in one direction and shrink in the other, depending on the material and its crystallographic orientation. This will cause the magnetic material to expand in one direction and/or shrink in the other. This can either increase or decrease the anisotropy, depending on the material and its crystallographic orientation.

While the invention has been described in terms of several examples, it will be apparent to those skilled in the art that various changes can be made to the described examples without departing from the scope of the invention as set forth in the following claims.

What is claimed is:

1. An apparatus comprising:
   a data storage medium including a piezoelectric material and a ferromagnetic material; and
   a recording head positioned adjacent to the data storage medium, the recording head including an electrode connected to voltage source for applying an electric field to a portion of the data storage medium and a magnetic write pole for applying a magnetic field to the portion of the data storage medium.

2. The apparatus of claim 1, wherein the data storage medium comprises:
   a layer of the ferromagnetic material adjacent to a layer of the piezoelectric material.

3. The apparatus of claim 1, wherein the data storage medium comprises:
   a plurality of islands of the ferromagnetic material in a matrix of the piezoelectric material.

4. The apparatus of claim 1, wherein the data storage medium comprises:
   a plurality of pillars in a matrix of non-ferroelectric and non-piezoelectric material, wherein each of the pillars includes a layer of the ferromagnetic material and a layer of the piezoelectric material.

5. The apparatus of claim 1, wherein the data storage medium comprises:
   a plurality of ferromagnetic nanoparticles in a matrix of the piezoelectric material, or a plurality of piezoelectric nanoparticles in a matrix of ferromagnetic material.

6. The apparatus of claim 1, wherein the data storage medium comprises:
   a plurality of nanoparticles in a matrix of non-ferroelectric and non-piezoelectric material, wherein each of the nanoparticles includes the ferromagnetic material and the piezoelectric material.

7. The apparatus of claim 1, wherein the
   voltage source is connected between the electrode and the data storage medium.

8. The apparatus of claim 1, wherein the
   voltage source is connected between the electrode and the magnetic field source.

9. The apparatus of claim 1, further comprising:
   a second electrode, wherein the voltage source is connected between the first and second electrodes.

10. The apparatus of claim 9, wherein the first and second electrodes are positioned on opposite sides of the write pole.

11. The apparatus of claim 1, wherein:
    the ferromagnetic material comprises one of a magnetic alloy, $Tb_xDy_{1-x}Fe_y$, wherein $0.30<x<0.33$ and $1.8<y<2.2$, $NiFe_2O_4$, FePt, $Co_3Pt$, a Co/Pt multilayer, or a Co alloy; and
    the piezoelectric material comprises one of PZT ($PbZrTiO_3$), PT ($PbTiO_3$), PZ ($PbZrO_3$), PLZT $(PbLa)(ZrTi)O_3$, $Pb(Mg,Nb)O_3$, $Pb(Zn,Nb)O_3$, or $Pb(Sc,Nb)O_3$.

12. The apparatus of claim 1, wherein the electrode is the write pole.

13. The apparatus of claim 1, wherein the electrode is positioned adjacent to the write pole.

* * * * *